UNITED STATES PATENT OFFICE.

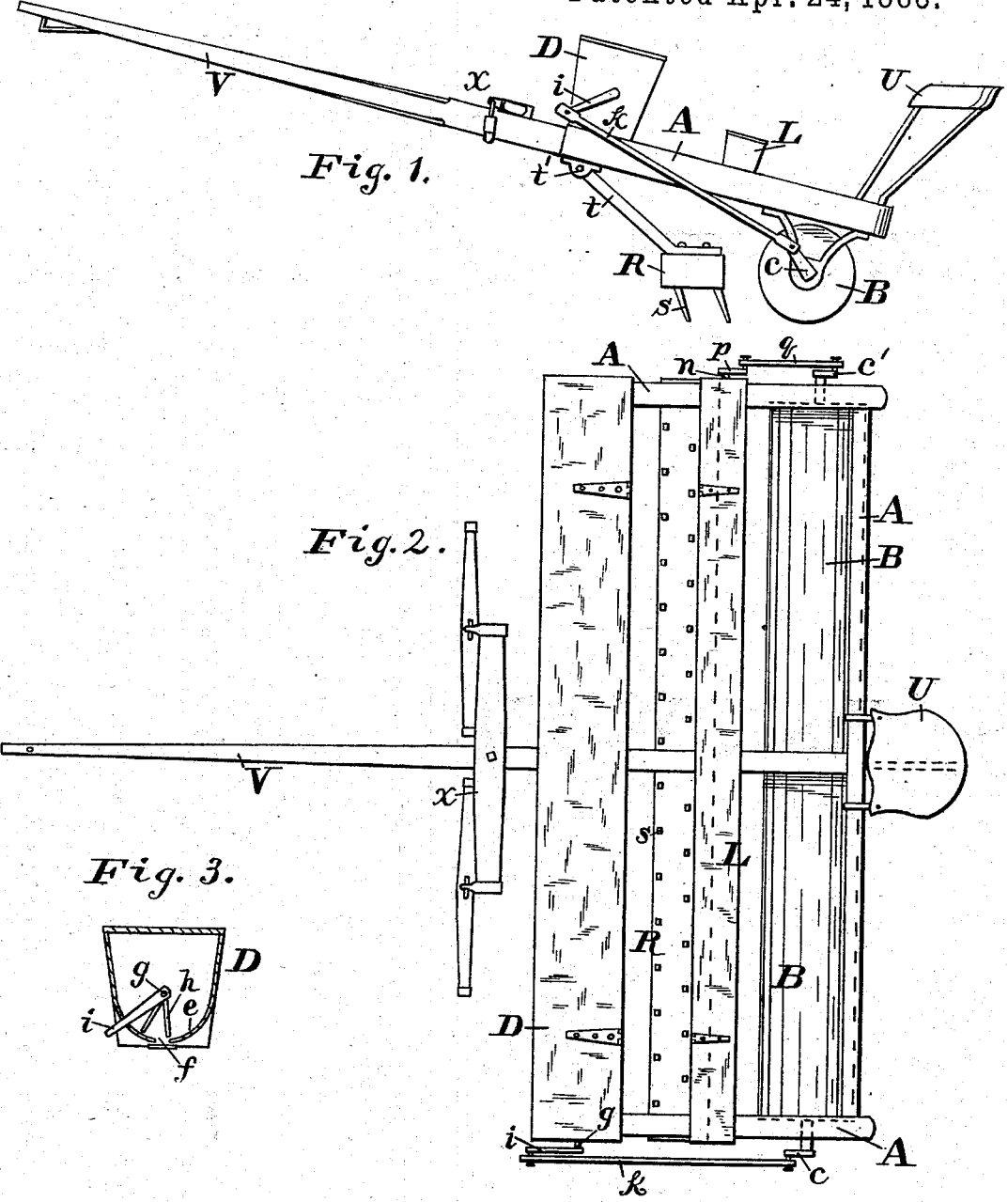

THOMAS R. CRANE, OF MANTUA, VIRGINIA.

COMBINED SEED-SOWER, FERTILIZER, HARROW, AND ROLLER.

SPECIFICATION forming part of Letters Patent No. 276,361, dated April 24, 1883.

Application filed August 31, 1882. (No model.)

*To all whom it may concern:*

Be it known that I, THOMAS R. CRANE, a citizen of the United States, residing at Mantua, (Heathsville P. O.,) Northumberland county, Virginia, have invented certain new and useful Improvements in a Combined Sower for Seed and Fertilizers, Harrow and Roller, of which the following is a specification, reference being had therein to the accompanying drawings.

My invention relates to a machine for distributing fertilizers, harrowing the surface of the ground on which the fertilizer has been spread, sowing seed, and finally rolling the harrowed surface to press the seed down. The construction of the machine will first be described, and the invention will then be designated in the claim.

In the drawings hereto annexed, Figure 1 is a side elevation, and Fig. 2 a top view, of the machine. Fig. 3 is a sectional view of the fertilizer-box.

The letter A designates the wooden frame, which is rectangular. The frame is mounted on a roller, B, and a crank, c, is attached to the journal at one end of the roller, and a crank, $c'$, at the other. It will be observed that the roller is under the rear end of the frame.

Upon the frame, at its forward end, is a box or hopper, D, to contain fertilizers. This box has a bottom whose interior upper surface is hollowed or half-cylindrical in form, as shown at e. Extending lengthwise of this bottom are openings $f$ for the discharge of the fertilizers. The discharging capacity of these openings is regulated, or they may be entirely closed, by a slide-bar on the bottom of the hopper, which device may be constructed and operated in a manner well understood, and which, therefore, need not be more particularly described here. A rock-shaft, $g$, extends lengthwise of the hopper, and attached thereto are a number of arms, $h$. At one end of the shaft is a lever, $i$, of greater length than the crank $c$, attached to the journal of the roller. A rod, $k$, connects the lever $i$ with the crank $c$. By this arrangement the revolution of the roller gives a swinging or vibrating movement to the lever, and this gives motion to the rock-shaft, the arms $h$ of which swing back and forth crosswise of the hollowed or half-cylindric bottom, and thereby so agitate the fertilizer, as to crumble it up into small particles, adapting it to pass out the openings and scatter broadcast on the ground.

Upon the frame, and about midway between the forward and rear ends, is another box or hopper, L, to contain seed. While this box is smaller in size, it has a bottom and openings therein, like those described for box D. It also has a rock-shaft, $n$, arms attached thereto, and a lever, $p$, similar to those of box D. A rod, $q$, connects the lever $p$ with the crank $c'$, and the operation is the same as that of the fertilizer-box. By this arrangement the roller, without complicated mechanism, is made to agitate the fertilizer and the seed, and the agitation in either may cease without the other being affected.

A harrow, R, consists of a beam, having teeth $s$, the points of which are pitched or inclined to the rear, or away from the direction in which the harrow is to move. Each end of the harrow has a rod, $t$, attached, and these rods are pivoted at $t'$ to the frame, at its forward part, whereby the harrow is dragged. The position of the harrow is a matter of consequence to effect what is designed by this machine—namely, to first distribute the fertilizer, then harrow the ground on which the fertilizer has dropped, next to sow the seed, and finally to roll. The harrow therefore has position on the ground so as to be between the fertilizer-distributer and the seed-sower.

A seat, U, for the driver, is mounted above the rear end of the frame and projects back therefrom, and of course back from and beyond the roller. By this arrangement the weight of the machine, all of which rests upon the roller, may be so balanced when the driver is in the seat that the forward end of the frame will not hang heavily on the necks of the animals.

A pole, V, is attached to the frame, and a double-tree, $x$, is provided, by which two animals may be employed.

For sowing grass-seed, and at the same time applying a fertilizer on ground containing growing wheat, harrowing, and finally rolling the ground, this machine is very effective, while its simplicity of construction enables it to be built at low cost. As a grass-seeder, harrow, and roller, it is perfect.

I do not here claim the combination of the several parts or instrumentalities herein described, as I am aware that the same have heretofore been employed together; but I am not aware that a machine has ever before been organized with its several parts arranged to work together in the sequence described, so as to effect the desired end.

Having described my invention, I claim and desire to secure by Letters Patent of the United States—

A seed-sower having the frame A, supported wholly by the rear end resting upon the ground-roller B, the fertilizer-box D, resting upon the forward end of the frame, the seed-box L, upon the frame in front of the ground-roller, and a drag-harrow, R, having position between the fertilizer-box and the seed-box, whereby the fertilizer is first dropped, the ground whereon it is distributed is then harrowed, the seed is then dropped on the harrowed surface, and, finally, the roller presses the seed into the harrowed surface, as set forth.

In testimony whereof I affix my signature, in presence of two witnesses, this 18th day of August, 1882.

THOMAS R. CRANE.

Witnesses:
JOHN E. MORRIS,
JNO. T. MADDOX.